March 30, 1965  H. W. BOTELER ETAL  3,175,473
SPRING AND FLUID PRESSURE ACTUATOR
Filed May 1, 1962  5 Sheets-Sheet 1

FIG. 1

INVENTORS
HENRY W. BOTELER
WILLIAM L. LINKER
BY
Martin D. Wittstein
ATTORNEY

INVENTORS
HENRY W. BOTELER
WILLIAM L. LINKER
BY Martin D. Wittstein
ATTORNEY

FIG. 6

INVENTORS
HENRY W. BOTELER
WILLIAM L. LINKER
BY
ATTORNEY

United States Patent Office 3,175,473
Patented Mar. 30, 1965

3,175,473
SPRING AND FLUID PRESSURE ACTUATOR
Henry W. Boteler, East Greenwich, and William L. Linker, Coventry, R.I., assignors to Grinnell Corporation, Providence, R.I., a corporation of Delaware
Filed May 1, 1962, Ser. No. 191,526
5 Claims. (Cl. 92—128)

This invention relates generally to improvements in valve actuators. More particularly, it has to do with fluid pressure actuators for valves and other equipment wherein a fluid pressure medium is utilized to move an actuator driving part in one direction against the restoring force of a spring assembly or equivalent stored energy mechanism, normally urging such part in the opposite direction and having means integral therewith for locking the spring assembly parts against movement relative to the actuator housing thereby withdrawing and restraining the aforementioned restoring force from the piston member.

Fluid pressure actuators of the type to which this invention relates have long been known and are widely used for the operation of valves and other equipment which are remotely controlled from a central station, or which, for some other reason, cannot be conveniently operated by hand. For example, a valve may be placed in such a position or location that it is not readily accessible; or the force required to actuate it may be such as to make power operation a necessity. Whatever the reason, fluid pressure actuators for performing these operations have found widespread acceptance, and their applications are continuously increasing.

One form of such actuators generally comprises a housing which, together with a piston member movably mounted therein, defines at least one fluid pressure chamber. The piston member is movable, in at least one direction of motion, in response to the force created by the admission of a pressure medium into the fluid pressure chamber. Also mounted in the housing is a stored energy unit, preferably in the form of a spring mechanism which acts to exert a force on the piston member in a direction opposite to the first mentioned direction and to normally urge the piston member in this opposite direction. In use, the actuator housing is mounted directly upon the valve housing or bonnet, and the actuator piston is connected to the movable valve closing member through a connecting rod. Movement of the actuator piston is thereby transmitted to the movable valve closing member.

In another form, the spring unit is contained in a housing separate from the fluid pressure actuator and is attachable thereto and which has means for transmitting the force of the spring unit from the spring unit housing to the actuator parts within the actuator housing.

One major problem which has confronted users of these actuators is that of disassembly for service or replacement of parts, and subsequent reassembly when such service is completed or parts replacement accomplished. Prior to the present invention, it has been necessary, in order to disassemble the actuator, to first remove it from its operative position on the valve and then to insert the actuator housing into a press of substantial size thereby permitting the bolts holding the actuator housing sections together to be removed without the housing sections flying apart in response to the force of the springs contained and compressed therein. The importance of this step can be more readily appreciated when it is understood that the springs in the actuators exert a force ranging from 400 to 2000 pounds, depending upon the actuator size. To resist such forces during disassembly of the actuator, or disassembly of the separable spring package as the case may be, clearly requires a press of considerable size and one not ordinarily found in the field, necessitating movement of the entire actuator, or the separate spring package, to the location of the press. Upon removal of the bolts, the press was then actuated to gradually separate the housing sections until the springs were extended to their normal unstressed length and all compressive force removed therefrom. Only at this point could the parts be handled safely.

A reverse procedure was necessary to reassemble the actuator when the service thereon was complete or when replacement of parts had been accomplished. Thus, the actuator housing sections, with the various parts located therein, was inserted in the press and the press actuated to forcibly compress the springs until the housings sections were properly positioned together to permit reinsertion of the housing retaining bolts. The actuator was then removed from the press and reinstalled on its operated device.

It is at once apparent that a procedure as outlined above is not only quite cumbersome and the cause of great inconvenience because of the necessity of heavy equipment during the disassembly procedure, but also costly in terms of time during which the valve or other operated mechanism is shut down because of the absence of the actuator. Also, in some types of prior art actuators, it is impossible to remove the actuator from the valve without first removing the valve bonnet and diaphragm from the valve body. This, of course, requires shutting down the line for so long as the actuator is off the valve, with its consequent cost.

The present invention is directed toward overcoming these and other problems by providing an actuator which includes mechanism integral therewith for locking the spring assembly parts against movement relative to the actuator housing thereby removing all spring force from the piston member and consequently from the movable valve closing parts, and for subsequently gradually relieving the springs of their compressive force, so that the actuator may be completely disassembled and reassembled without removing it from the valve or other equipment which it operates, and without the necessity of any heavy equipment or tools.

Accordingly, it is an object of the present invention to provide an improved actuator for valves and like mechanisms which can be readily disassembled and reassembled in situ.

It is another object of the present invention to provide an actuator for valves and like mechanism having means integral therewith to facilitate disassembly and reassembly of the actuator parts without the necessity of removing the actuator from its place of use.

Still another object of the present invention is the provision of an actuator for valves and like mechanisms having means associated therewith whereby the actuator may be disassembled and reassembled in situ by the use of small hand tools only.

It is another object of the present invention to provide an actuator for valves and like mechanisms wherein provision is made for restraining the actuating springs which tend to maintain the valve in closed position against elongation even after the housing portions which normally contain the springs have been disconnected.

It is still another object of the present invention to provide an actuator for valves and like mechanisms wherein a mechanism interconnects a spring supporting plate and a portion of the actuator housing to lock the spring against movement relative to that portion of the housing thereby withdrawing and restraining the force of the spring unit from the actuator piston member.

It is yet another object of the present invention to provide an actuator for valves and like mechanisms wherein the removal of a single section of the actuator housing permits access to both the actuator operating parts and the spring mechanisms operating parts.

Still another object of the present invention is the provision of an actuator for valves and like mechanisms wherein the means by which the spring is locked against the aforementioned relative movement serves also as a position indicator for the valve closure member and as a travel stop for the valve closure member.

Another object of the present invention is the provision of a valve actuator in which the means by which the spring is locked against the aforementioned relative movement serves also as a means for opening the valve manually in the event of failure of the fluid pressure systems or other malfunction of the actuator.

It is still another object of the present invention to provide an actuator which is simple in construction, economical to manufacture, and which requires a minimum of maintenance in operation.

Other objects and advantages of the present invention will become apparent from the detailed description which follows when considered in conjunction with the accompanying drawings.

In the drawings, in which the same reference numerals are used throughout the several views to indicate like parts.

Referring now to the drawings, the principles of this invention are illustrated as being associated with a valve of the diaphragm type, although it is apparent that any other device having a correspondingly movable operating component may be substituted therefore. Since this valve is of well known construction, a brief description thereof will suffice; accordingly, referring to FIGS. 1 and 2, valve 10 is seen to comprise a substantially tubular body member 12 having a longitudinally extending flow passageway 14 therethrough which terminates at opposite ends in inlet and outlet openings 16 and 18 respectively. The body member 12 is interrupted approximately midway between the openings 16 and 18 by an inwardly extending, laterally elongate protrusion which forms a dam or weir 20 over which material flowing through the body 12 must pass. The weir 20 has an upper surface 22 which forms a seat against which is pressed, by mechanism yet to be described, a movable valve member consisting of a flexible diaphragm 24 fabricated from a suitable resilient material such as rubber, plastic, or a combination of both. The diaphragm 24 covers an opening 26 formed in the surface of the body member 12 opposite the seating surface 22 of the weir 20, and is clamped in place over this opening by a cover or bonnet 28, the latter being secured to the body member 12 by means of bolts 30 or other convenient means.

Figure 2:
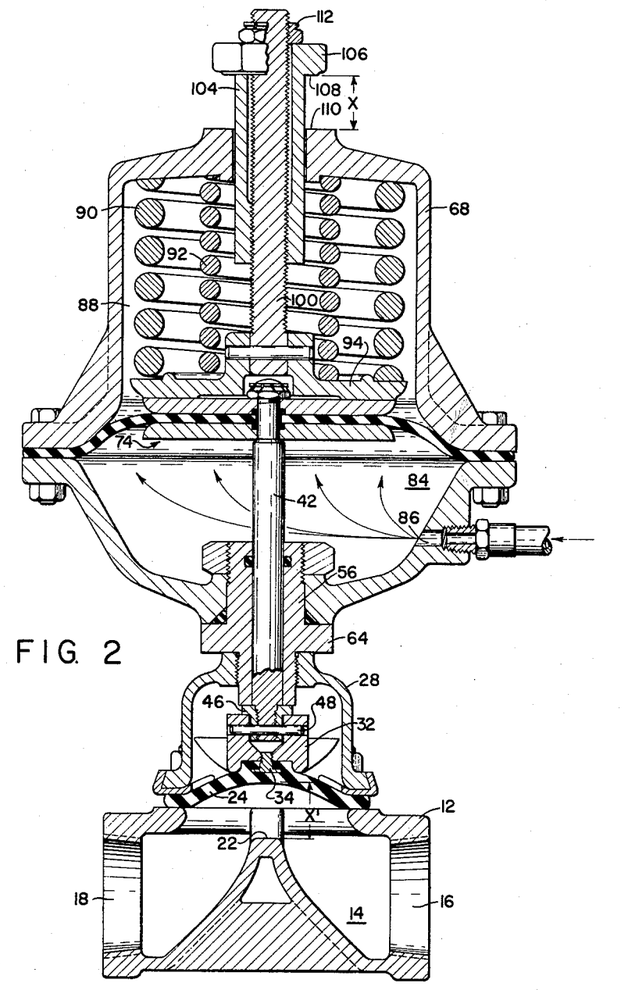
FIGURE 2 is a view similar to FIG. 1, but showing the parts in their valve open position.

The bonnet 28 encloses the actuating mechanism of the valve 10, which mechanism is isolated by the diaphragm 24 from the material flowing through the valve body 12. This mechanism comprises a pressing member or compressor 32 which has an under surface configuration corresponding to that of the seating surface 22 of weir 20 and which overlies the diaphragm 24 so that when the compressor 32 is moved downwardly, it will cause the diaphragm 24 to be firmly pressed against the seating surface 22 to effectively block the flow of material through valve 10. The diaphragm 24 is secured to the compressor 32 by a stud 34 which has its head portion embedded in an enlarged boss centrally located on the back or dry side of the diaphragm 24 and has a shank portion threadedly engaged in a correspondingly threaded bore in the compressor 32. The compressor 32 is formed with an upwardly facing recess 38 which is adapted to receive the threaded end portion 40 of a connecting rod 42. An internally threaded collar 44 is mounted on the end portion 40 and has an annular flange 46 which is adapted to bear upon the upper surface of the compressor 32. The flange 46 also serves as a travel stop for the actuator and valve parts in the valve opening direction of motion by abutting the lower end of bushing 56 when the valve is in its open position, as seen in FIG. 2. The threaded end portion 40 and collar 44 are both secured to the compressor 32 by means of a pin 48 inserted laterally through aligned bores in the compressor 32, collar 44, and threaded end portion 40 respectively. The connecting rod 42 passes upwardly through an opening in the top of the bonnet 28 and is connected at its opposite end to an actuator generally designated by the reference numeral 50, for operation thereby.

The operation of the valve 10 is as follows: Upward movement of the connecting rod 42, by mechanism hereinafter described, draws the compressor 32 upwardly through the pin connection 48, the compressor 32 drawing the diaphragm 24 upwardly therewith through stud 34; the diaphragm 24 is thus removed from contact with seating surface 22 of the weir 20, permitting material to flow through the valve body. The parts now occupy the positions shown in FIG. 2. When it is desired to close the valve, the connecting rod is moved downwardly thereby causing the compressor 32 to forcibly re-engage the diaphragm 24 with the seating surface 22 returning the parts to the positions shown in FIG. 1. It will be noted that the force of the connecting rod 42 is distributed throughout the compressor 32 and thence over a large area of the diaphragm and is not concentrated on the area of the head portion of stud 34.

Coming now to the actuator of the present invention, FIGS. 1–4 illustrate one embodiment thereof which is generally designated by the reference numeral 50, and comprises somewhat bowl-shaped lower housing portion 52 having an opening 54 in the bottom portion thereof through which is inserted one end of a tubular bushing 56 and which is secured in the opening 54 by a lock nut 58. The opposite end of the bushing 56 is threadedly engaged with a threaded opening 60 formed in the top of the bonnet 28. An O-ring or other suitable gasket 57 seals the lower housing portion to the bushing 56. Thus, the lower housing portion 52 is fixedly mounted upon the bonnet 28, and is properly spaced therefrom by a flange portion 64 which projects radially from the bushing 56. The bushing 56 is further provided with a longitudinal bore 62 through which the connecting rod 42 passes and which also serves to guide the connecting rod 42 for vertical reciprocative motion.

The lower housing portion 52 terminates upwardly in an outwardly extending flange 64 to which is secured, as by bolts 66 or other convenient means, an upper housing portion 68 having a corresponding outwardly extending flange 70. This housing portion may be either a solid member as shown, or it may take the form of a spider or other type of open frame structure with only sufficient mass to form an enclosure for containing the hereinafter described spring unit. Captured between the flanges 64 and 70 is the marginal portion of a resilient diaphragm 72 which forms part of a piston member, generally designated by the numeral 74, and which is mounted for reciprocative movement with the chamber formed by housing portions 52 and 68. The piston member 74 further comprises a pair of plates 76 and 78 respectively which are disposed on opposite sides of the resilient diaphragm 72 over a central portion thereof and by means of which the diaphragm is secured to the upper end of connecting rod 42. The plates 76 and 78, with the diaphragm 72 therebetween, are clamped between the shoulder 80 adjacent the upper end of the connecting rod 42 and a retaining nut 82 threadedly engaged thereon. Accordingly, any movement of the piston member 74 will be transmitted to the connecting rod 42 and cause a corresponding movement thereof.

The piston member 74 and the lower housing portion 52 together form an enclosed pressure chamber 84 into which is introduced a pressure medium through a suitable aperture 86 provided in the side of the lower housing portion 52. The piston member 74 is moved upwardly by the admission of such pressure medium into the pressure chamber 84. An O-ring seal 87 prevents leakage of the pressure fluid past the connecting rod 42 in bore 62.

The piston member 74 and the upper housing portion 68 together form a second chamber 88 which contains the spring mechanism utilized to move the piston member 74 in a direction opposite to that in which it is moved in response to the pressure fluid in the pressure chamber 84. It should be understood that if the upper housing portion is merely a spider as mentioned above, then the chamber 88 will be merely the space enclosed by such spider in which the spring unit is contained. Such space is generally hereinafter referred to as the second chamber.

The spring unit or mechanism comprises a plurality of coil springs, in the illustrated embodiment two springs of different size indicated by the numerals 90 and 92 respectively. The springs are captured between the top wall of the upper housing portion 68, and a bearing plate 94 which is adapted to bear on the upper plate 78 of the piston member 74. Bearing plate 94 has an upwardly extending central boss 96 provided with an aperture 98 therein which receives the lower end of a spring rod 100. A pin 101 connects the spring rod 100 to the bearing plate boss 96 by passing through aligned holes in these two members.

Spring rod 100 is threaded throughout most of its length for cooperation with a correspondingly threaded sleeve nut generally indicated by the numeral 102. The sleeve nut 102 has an elongated tubular portion 104 which is threaded internally over a short extent of its length adjacent the lower end thereof for cooperation with the threads on the spring rod 100. The sleeve nut 102 terminates upwardly in an outwardly protruding collar 106 the under surface of which forms a shoulder 108 which cooperates with an upwardly extending boss 110 formed in the top wall of the upper housing portion 68. The shoulder 108 and boss 110 together constitute a travel stop for the actuator and valve parts in the valve closing direction of movement to control the degree to which the valve can be closed. Collar 106 is shaped for the reception thereon of a wrench or similar hand tool for a purpose hereinafter described. A lock nut 112, threaded on the upper end of spring rod 100, prevents rotation of a sleeve nut 102 relative to spring rod 100, thereby maintaining a pre-set adjustment. The top portion of upper housing portion 68, including the boss 110, is provided with a bore 114 through which the sleeve nut 102 can slide freely upon actuation of the device.

Figure 1:
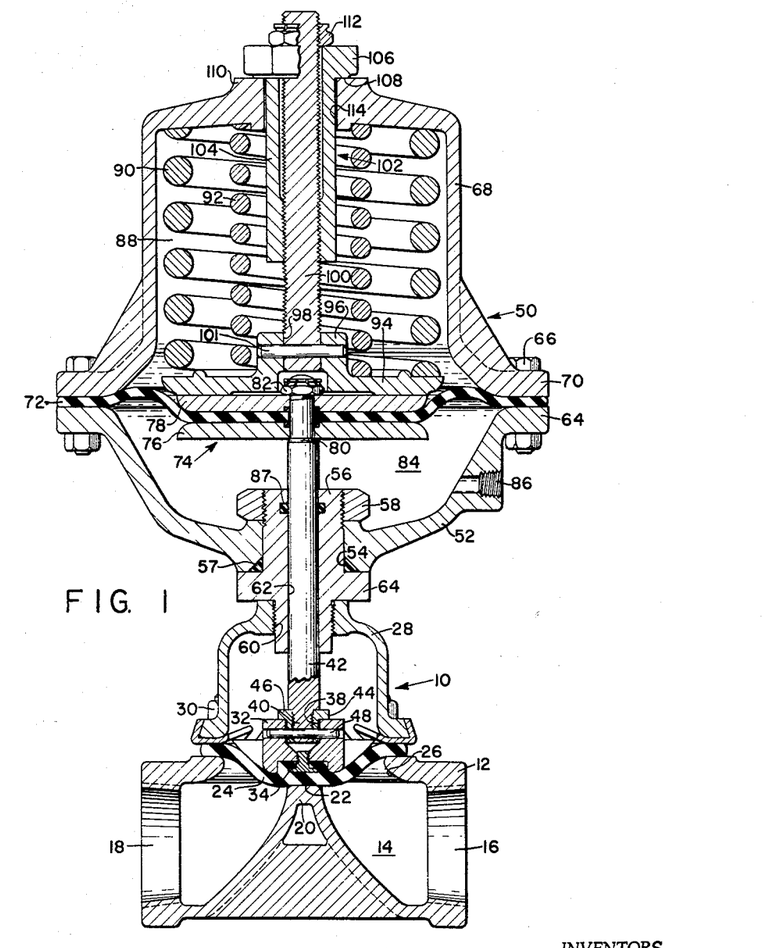
FIGURE 1 is a vertical sectional view through one embodiment of the invention and illustrating the parts in their valve closed position.

The operation of this embodiment of the invention should be apparent from the above description: Assuming the parts to be in the positions as seen in FIG. 1, admission of pressure fluid into the pressure chamber 84 exerts sufficient upward force on piston member 74 to overcome the opposing force of springs 90 and 92, thereby moving piston member 74, connecting rod 42, compressor 32, diaphragm 24, pressure plate 94, spring rod 100, and sleeve nut 102 upwardly until the flange 46 of collar 44 abuts the lower end of the bushing 56. These parts now assume the position shown in FIG. 2. It will be noted from this figure that the vertical distance X between the shoulder 108 and the upper surface of the boss 110 is equal to the vertical distance X' which is the stroke of the diaphragm 24. To close the valve, the pressure chamber 84 is vented by appropriate means (not shown) and the aforementioned parts return, under the action of springs 90 and 92 through pressure plate 94, to their FIGURE 1 position.

As briefly stated hereinabove, the actuator can be completely disassembled for service or replacement of parts without removing it from the valve bonnet and without the use of a press or other heavy equipment. It will be observed from FIG. 1 that the springs 90 and 92 are captured between the top wall of upper housing portion 68 and bearing plate 94, the latter being restrained against movement in the direction of spring expansion by rod 100, sleeve nut 102 and boss 110. Therefore the bearing plate is locked against movement relative to the actuator housing portion 68 at least in the aforementioned direction of motion and the springs 90 and 92 cannot expand beyond the length indicated. Accordingly, bolts 66 can be removed without fear of the upper housing portion being hurled off the actuator by the action of the springs.

Figure 3:
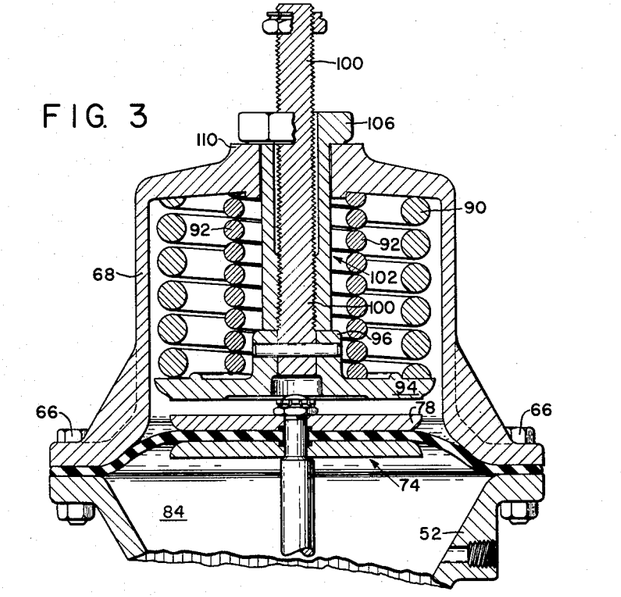
FIGURE 3 is a fragmentary vertical sectional view of the valve actuator immediately after all spring force has been removed from the piston member.

As a practical matter, however, to reduce the stress imposed by the springs on bolts 66, some pressure medium is normally admitted to the pressure chamber 84 to move the valve and actuator parts at least partially toward their valve open positions, and preferably all the way to this position if the valve is operating under a high line pressure. At this point, the sleeve nut 102 is given one or two turns in a clockwise direction with a wrench placed over the collar 106, thus completely withdrawing the bearing plate 94 from contact with the piston member 74, as seen in FIG. 3. Since the force of the springs 90 and 92 has now been removed from the piston member 74 and the valve components, the actuator housing sections 52 and 68 may be separated by removal of the several bolts 66. At this time, if desired, another upper housing portion 68 with spring components and pressure plate already inserted therein may be substituted for the assembly just removed. While this procedure is relatively simple, it, of course, requires that the user of the valve maintain a supply of complete upper housing portions and spring assemblies on hand, a procedure which is comparatively costly.

Figure 4:
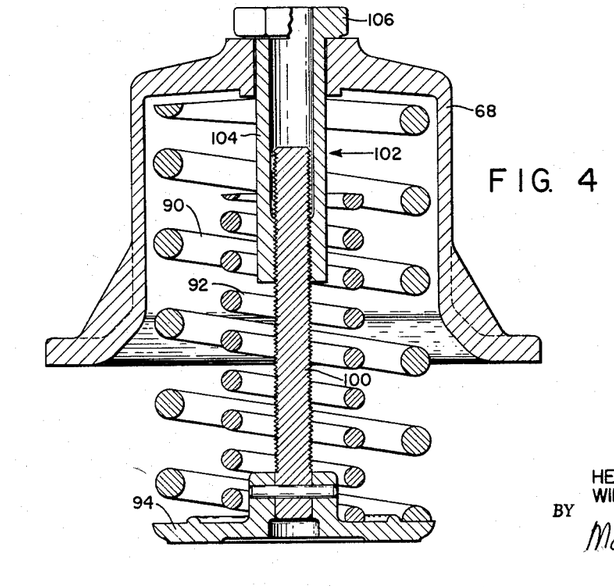
FIGURE 4 is a fragmentary vertical sectional view of a position of the valve actuator after separation of the housing sections and complete relaxation of the springs to their unstressed length.

This difficulty may be readily overcome in the manner illustrated in FIG. 4 wherein the parts are shown in a position just prior to complete disassembly of the spring mechanism. The sleeve nut 102 is rotated in a counter clockwise direction relative to spring rod 100 so that the latter is moved downwardly through the sleeve nut 102 to permit expansion of the springs 90 and 92 to their full unstressed length. Of course, the locking nut 112 has been previously removed. Continued rotation of the sleeve nut 102 results in the complete disconnection of the spring rod 100 from sleeve nut 102 so that springs 90 and 92 can be readily replaced by other springs of different force. Thus, it is seen that the user of the valve and valve actuator need only keep on hand such springs as are required to close the valve against different operating pressures which he may encounter in his use of the valve.

The actuator device is reassembled by following a procedure substantially opposite to that outlined above, i.e., the replacement springs are placed over the spring rod 100 which is then threaded into sleeve nut 102 until the springs are compressed by rotation of the sleeve nut 102 in a clockwise direction to the maximum limit illustrated in FIG. 3 whereupon the upper housing portion 68 is reassembled to the lower housing portion 52; the spring force is then reapplied to the piston member 74 by rotating sleeve nut 102 counter clockwise to cause pressure plate 94 to reengage the plate 78 of piston member 74. The actuator is now in condition for normal operation.

It should be noted that by virtue of the construction described above, the removal of a single housing portion, namely the upper housing portion 68, permits access to both the spring assembly and the actuator operating components, e.g., the piston assembly 74. Also, since the spring assembly is contained within the actuator housing and not in a separate housing of its own, the need for complicated interconnecting and force transmitting structure is eliminated, thus reducing the cost of the complete unit.

Figure 5:
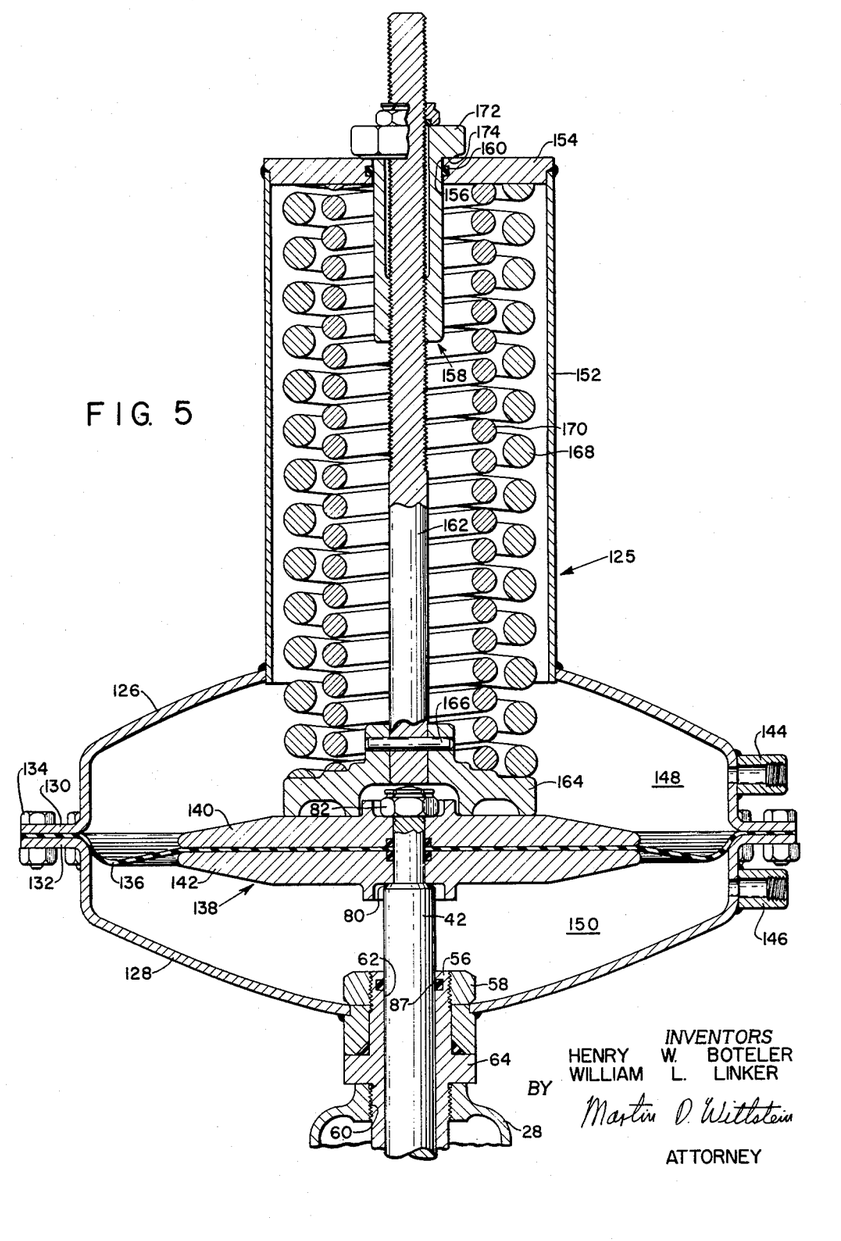
FIGURE 5 is a vertical section view similar to FIG. 1 illustrating another embodiment of the invention.

FIGURE 5 illustrates another embodiment of the invention in which an actuator, generally designated by the reference numeral 125, of the double acting type, i.e., air operated in both directions of movement, is employed, as distinguished from the above described single acting type which is air operated in the valve open direction, but spring operated in the opposite direction. In this embodiment, the actuator comprises a housing composed of upper and lower oppositely facing bowl shaped portions 126 and 128 respectively. The lower portion 128 is mounted on the valve bonnet 28 by means of a bushing 56 and lock nut 58 in the same manner as the lower housing portion 52 of the single acting actuator described above. The upper and lower housing portions each have outwardly extending flanges 130 and 132 which are secured together by means of bolts 134, and which grip therebetween the marginal portion of a diaphragm 136, the latter forming part of a piston member 138. The diaphragm 136 is given rigidity by means of upper and lower plates 140 and 142, which also serve as mounting means for securing the central portion of diaphragm 136 to the connecting rod 42 by being clamped between the shoulder 80 and the lock nut 82 on the upper end of the connecting rod. Each housing portion 126 and 128 has a suitable fitting 144 and 146 through which pressure fluid is admitted to the upper and lower pressure chambers 148 and 150, which are formed respectively by the upper housing portion 126 and the piston member 138, and the lower housing portion 128 and the piston member. By this structure, the piston member may be forced either upwardly or downwardly, moving the connecting rod 42 therewith, by the admission of pressure fluid to one or the other of the aforementioned chambers.

The upper housing portion 126 is provided with an upstanding extension formed by a cylindrical component 152 welded or otherwise suitably secured to the housing portion 126, and a top wall 154 secured to the cylindrical component 152. The top wall 154 is apertured to provide an opening 156 in which a sleeve nut 158 is adapted to slide in sealing relationship with a sealing ring 160. The upper chamber 148 is thereby sealed against the escape of pressure fluid. A spring rod 162 is threadedly engaged with the sleeve nut 158, and is connected at its bottom end to a bearing plate 164 through a connecting pin 166. A pair of springs 168 and 170 are captured between the bearing plate 164 and the top wall part 154 so as to urge the bearing plate 164 downwardly and into engagement with the piston member 138. The sleeve nut 158 is provided at its upper end with a collar 172 which is adapted to be turned by a wrench or similar tool, and which has a shoulder 174 which bears on the upper surface of the top wall 154 to act as a travel stop when the valve is in its fully closed position.

The operation of this embodiment of the invention is identical to that of the embodiment of FIGS. 1-4, with the exception that upon admission of pressure fluid into the upper chamber 148 through air inlet 144, the piston member 138 is forced downwardly in a valve closing direction and is assisted in this direction of movement by the force of springs 170 and 172. This type of actuator is desirable in installations where it requires considerably more force to close the valve than to open it. In such installations, the air pressure available may be sufficient to open the valve, but insufficient to provide the force necessary to effect a tight seal between the diaphragm and the seating surface on the weir. The force exerted by the springs assist in the valve closing direction of movement so that an unnecessarily high air pressure need not be provided and a tight closure of the valve is still obtained.

Since the procedure for disassembling the actuator of this embodiment of the invention is substantially identical to that described for the previous embodiment, a repetition of that description is not deemed necessary.

Figure 6:
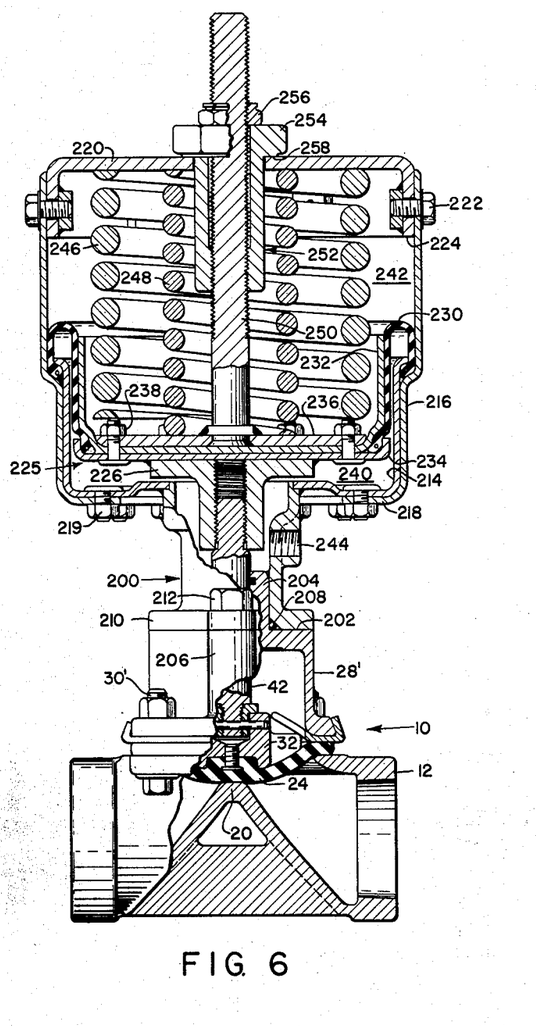
FIGURE 6 is a vertical section view similar to FIG. 5 illustrating still another embodiment of the invention.

FIGURE 6 illustrates still another embodiment of the invention in which the actuator is a modified Bendix-Westinghouse Rotochamber which is mounted on a diaphragm valve of the same type illustrated with the embodiment of FIGS. 1-4. Therefore, further description of the valve 10 is deemed unnecessary. However, the bonnet 28' of this valve has been modified slightly to accommodate an adapter spool 200 by which the Rotochamber is mounted upon the bonnet 28'. More particularly, the bonnet 28' has a peripheral flat top portion 202 which surrounds a central upstanding bushing 204 which slidingly receives a connecting rod 42 similar to the connecting rod 42 of the previous embodiments. A plurality of internally threaded bosses 206 are provided on the side of the bonnet 28' at spaced intervals therearound.

The adapter spool 200 fits snugly around the central bushing part 204 of the bonnet 28' and is sealed thereto by a sealing gasket 208. The adapter spool 200 terminates downwardly in a flange 210 which rests on the flat top portion 202 of bonnet 28' and which has hollow bosses which mate with the bosses 206 formed in the bonnet 28'. Bolts 212 are passed through the hollow bosses on the adapter spool flange 210 and are threaded into the bosses 206 to secure the adapter spool 200 to the valve bonnet.

Welded or otherwise suitably secured to the upper end of the adapter spool 200 is the bottom wall of a mounting cup 214 from which the center has been removed. A cylindrical casing 216 is mounted on the mounting cup 214 by means of a lower inturned flange 218 which is secured as by bolts 219 to the bottom wall of mounting cup 214. A cap or top wall 220 is secured to the upper end of the cylindrical casing 216 by means of bolts 222 passed through the casing 216 and a downturned flange 224 on the cap 220. The adapter spool 200, mounting cup 214, casing 216 and cap 220 all form a housing within which a piston member 225 is reciprocatively mounted. The piston member 225 is secured to a coupling member 226 as by welding, the coupling member having a tubular portion which is internally threaded for connection to the upper end of the connecting rod 42. Thus, the piston member 225 is connected to, and will reciprocate with, the diaphragm 24 of valve 10.

The piston member comprises a rolling sleeve type diaphragm 230, a sleeve guide 232, a sleeve retaining plate 234, and a spring bearing plate 236. The sleeve guide 232, retaining plate 234, and bearing plate 236 are all secured together by a plurality of bolts 238. One end of the rolling sleeve 230 is captured between a medial portion of the sleeve guide 232 and an upturned lip surrounding the retaining plate 234, and is held securely therein by means of the aforementioned bolts 238. The opposite end of the rolling sleeve 230 is captured between a medial portion of the frame or casing 216 and an outwardly flared lip on the upper end of the mounting cup 214, and is held securely therein by means of the bolts 219 which act to forcibly engage the medial portion of the casing 216 with the aforementioned lip on the mounting cup 214. It is now apparent that the piston member 225, together with the coupling member 226 and connecting rod 42, is free to move up and down with the actuator housing, and that the rolling sleeve 230 moves therewith by continuously investing upon itself.

The piston member 225 and the rolling sleeve 230 together divide the space within the actuator housing into two chambers, a lower sealed pressure chamber 240 and an upper spring chamber 242, the latter being merely an enclosure in the event that the cap 220 is replaced by a spider type cover sufficient to contain the springs described herein below. The lower chamber has a pressure fluid fitting 244 for connection to a supply line through which pressure fluid is admitted into chamber 240 to force the piston member 225 and the rolling sleeve 230 upwardly. A plurality of springs 246 and 248, captured between the bearing plate 236 and cap 220, continuously urge the piston member 225 downwardly, tending thereby to maintain the valve in a closed condition.

It is now apparent that to disassemble the actuator, the bolts 222 are removed from the casing 216 to permit removal of the cap 220; however, without the structure presently described, if the bolts 222 are removed without first placing the actuator in a press, the cap will be hurled off the casing 216 by the compressed springs 246 and 248, thus creating an extremely dangerous situation. To overcome this difficulty, a spring locking mechanism is provided which is similar in structure to that described above in connection with the previous embodiments, but is somewhat different in operation. Suitably secured to the bearing plate 236 as by welding is a spring rod 250 which is threaded over a substantial portion of its length and which projects through an opening formed in the cap 220. A sleeve nut 252 is threadedly engaged with the spring rod 250 and has a collar 254 by which the sleeve nut is turned by a wrench or similar hand tool. A lock nut 256 prevents the sleeve nut 254 from turning of its own accord. The collar 254 has a shoulder 258 which normally rests on the upper surface of cap 220 when the valve is in its fully closed position, and acts as a travel stop in the valve closing direction of movement.

When it is desired to disassemble the actuator, the bolts 222 are first removed from the casing 216, the cap being restrained from movement because of the collar 254 of sleeve nut 252. After the bolts 222 have been removed, lock nut 256 is unthreaded from spring rod 250, whereupon the sleeve nut is rotated in a direction to disconnect it from the spring nut 250, permitting the cap 220 to move therewith in response to the force of springs 246 and 248. By this procedure the springs are gradually released to their full unstressed lengths, after which the entire assembly can be handled safely. After removal of the springs from the casing 216, the piston member 225, is disassembled by removing nuts 238, bearing plate 236 and spring rod 250 now being removed from casing 216. This last step releases the lower end of the rolling sleeve 230.

To release the upper end of the rolling sleeve 230, the nuts 219 are removed to permit the casing 216 to slide downwardly relative to the mounting cup 214. It can be seen that the upper end of the rolling sleeve will be released when the upper edge of casing 216 passes below the upper edge of mounting cup 214. Since, however, there is not a sufficient distance between the lower inturned flange 218 of casing 216 and the top of the bolts 30' which secure the bonnet 28' to the valve body 12 to permit the casing 216 to move downwardly the required distance relative to mounting cup 214 to enable the upper edge of casing 216 to clear the upper edge of mounting cup 214, the coupling member 226 together with the sleeve retaining plate 234 are unthreaded from the connecting rod 42, and bolts 212 are removed to permit the adapter spool 200 to move away from bonnet 28' so that the casing 216 will then have sufficient room to move the required distance. Thus, the entire assembly can be disassembled and serviced without first removing the actuator from the valve bonnet, and without the need for any heavy equipment.

It will be apparent from the foregoing description that there has been provided a fluid pressure actuator which is believed to provide a soluiton to the problems, and to fulfil the objectives hereinbefore set forth. It is to be understood, however, that the above description and accompanying drawings are to be deemed primarily as illustrative of the best modes presently contemplated of carrying out the principles of the invention, and that the device described and illustrated may be modified or altered in its form, proportions, details of construction and arrangement of parts without departing from the spirit and scope of the invention as defined in the appended claims.

What we claim and desire to secure by Letters Patent is:

1. A fluid pressure actuator comprising:
   (A) a housing,
   (B) a piston member movably mounted in said housing for reciprocative motion,
      (1) said piston member and a portion of said housing together defining at least one sealed chamber,
      (2) said piston member and another portion of said housing together defining a second chamber,
   (C) a connecting element secured to said piston member and adapted to be connected to a device which is actuated thereby,
   (D) means for admitting fluid under pressure into said sealed chamber to urge said piston member in one direction of movement,
   (E) compressible spring means in said second chamber for exerting a force on said piston member to urge said piston member in the opposite direction of movement,
   (F) a bearing plate mounted in said second chamber for reciprocative motion with said piston member for normally transmitting said force from said spring means to said piston member, and
   (G) means, extending from within said housing to the exterior of said housing adapted to abut the exterior of said housing and connected to said bearing plate by a threaded rod, for locking said bearing plate against movement in said opposite direction beyond a preselected limit whereby said spring is restrained from exerting force on said piston member.

2. A fluid pressure actuator comprising:
   (A) first and second housing portions,
   (B) means connecting said housing portions together to define a space therewithin,
   (C) a piston member movably mounted within said space for reciprocative motion,
      (1) said piston member and said first housing portion together defining at least one sealed chamber,
      (2) said piston member and said second housing portion together defining a second chamber,
   (D) a connecting element secured to said piston member and adapted to be connected to a device which is actuated thereby,
   (E) means for admitting fluid under pressure into said sealed chamber to urge said piston member in one direction of movement,
   (F) compressible spring means in said second chamber for exerting a force on said piston member to urge said piston member in the opposite direction of movement,
   (G) a bearing plate mounted in said second chamber for reciprocative motion, and independent of and normally contacting said piston member for transmitting said force from said spring means to said piston member when said first and second housing portions are connected together by said connecting means, and
   (H) means extending from within said second housing to the exterior of said second housing adapted to abut the exterior of said second housing and connected to said bearing plate by a threaded rod, for adjustably locking said bearing plate against movement in said opposite direction beyond a preselected limit when said first and second housing portions are connected together and for thereafter gradually releasing said compressible spring means when said housing portions are disconnected.

3. A fluid pressure actuator comprising:
   (A) first and second housing portions, (B) means connecting said housing portions together to define a space therewithin,
(C) a piston member movably mounted within said space for reciprocative motion,
   (1) said piston member and said first housing portion together defining at least one sealed chamber,
   (2) said piston member and said second housing portion together defining a second chamber,
(D) a connecting element secured to said piston member and adapted to be connected to a device which is actuated thereby,
(E) means for admitting fluid under pressure into said sealed chamber to urge said piston member in one direction of movement,
(F) compressible spring means in said second chamber for exerting a force on said piston member in the opposite direction of movement,
(G) a bearing plate mounted in said second chamber for reciprocative motion, independent of and normally contacting said piston member for transmitting said force from said spring means to said piston member when said housing portions are connected together by said connecting means, and
(H) means for adjustably limiting the movement of said bearing plate in said opposite direction of movement when said housing portions are connected together, and for thereafter gradually releasing said compressible spring means when said housing portions are disconnected, said means comprising:
   (1) a first member connected to said bearing plate and movable therewith and extending from the interior of said second chamber to the exterior of said second housing, and
   (2) a second member adjustably connected to said first member within said second chamber and movable selectively with said first member and relative thereto, said second member having means thereon adapted to abut the exterior of said second housing portion.

4. A fluid pressure actuator comprising:
(A) first and second housing portions,
(B) means connecting said housing portions together to define a space therewithin,
(C) a piston member movably mounted within said space for reciprocative motion,
   (1) said piston member and said first housing portion together defining at least one sealed chamber,
   (2) said piston member and said second housing portion together defining a second chamber,
      (a) said second housing portion having a top wall with an aperture therethrough and an abutment surface surrounding said aperture,
(D) a connecting element secured to said piston member and adapted to be connected to a device which is actuated thereby,
(E) means for admitting fluid under pressure into said sealed chamber to urge said piston member in one direction of movement,
(F) compressible spring means in said second chamber for exerting a force on said piston member in the opposite direction of movement,
(G) a bearing plate mounted in said second chamber for reciprocative motion and independent of and normally contacting said piston member for transmitting said force from said spring means to said piston member when said housing portions are connected together by said connecting means,
(H) a threaded rod connected at one end to said bearing plate and having its other end projecting through said aperture exteriorly of said second housing, and
(I) an elongate sleeve having a portion extending through said aperture into the interior of said second chamber and threadedly engaged with said rod whereby said sleeve is selectively movable with, and relative to, said rod,
   (1) said sleeve terminating exteriorly of said second housing portion in a radially projecting shoulder which contacts said abutment surface to limit the movement of said sleeve in said opposite direction of movement,
whereby said bearing plate is adjustably locked against movement in said opposite direction beyond a preselected limit for restraining said force from said piston member when said housing portions are connected together to permit the separation thereof, and whereby said bearing plate and said second housing portion are thereafter gradually separated to release said compressible spring means.

5. A fluid pressure actuator comprising:
(A) a housing,
(B) a cap having an aperture therethrough and an abutment surface surrounding said aperture,
(C) means removably connecting said cap to said housing,
(D) a piston member movably mounted in said housing for reciprocative motion,
   (1) said piston member and a portion of said housing together defining at least one sealed chamber,
   (2) said piston member, another portion of said housing and said cap all defining a second chamber,
(E) a connecting element secured to said piston member and adapted to be connected to a device which is actuated thereby,
(F) means for admitting fluid under pressure into said sealed chamber to urge said piston member in one direction of movement,
(G) compressible spring means in said second chamber for exerting a force on said piston member in the opposite direction of movement,
(H) a threaded rod in said second chamber connected at one end to a bearing plate which is fastened to said piston member and having its other end projecting through said aperture exteriorly of said cap, and
(I) an elongate sleeve having a portion extending through said aperture into the interior of said second chamber and threadedly engaged with said rod whereby said sleeve is selectively movable with, and relative to, said rod,
   (1) said sleeve terminating exteriorly of said cap in a radially projecting shoulder which contacts said abutment surface to limit the movement of said sleeve in said opposite direction of movement,
whereby said piston member is locked against movement in said opposite direction relative to said cap beyond a preselected limit to permit the removal of said connecting means, and whereby said cap is thereafter gradually separated from said housing and said piston member to release said compressible spring means.

References Cited in the file of this patent

UNITED STATES PATENTS

| | | |
|---|---|---|
| 2,527,814 | Hanssen | Oct. 31, 1950 |
| 2,671,470 | Boteler | Mar. 9, 1954 |
| 2,672,891 | Fausek | Mar. 23, 1954 |
| 2,697,599 | Vandal | Dec. 21, 1954 |
| 2,754,805 | Beman | July 17, 1956 |
| 2,976,085 | Grogan | Mar. 21, 1961 |
| 2,992,630 | Leighton | July 18, 1961 |
| 3,109,347 | Brodl et al. | Nov. 5, 1963 |
| 3,112,959 | Kateley | Dec. 3, 1963 |

FOREIGN PATENTS

| | | |
|---|---|---|
| 657,318 | Great Britain | Sept. 19, 1951 |